Nov. 22, 1955 H. C. ORTH 2,724,415
COIL WINDING MACHINE
Filed Oct. 25, 1951 4 Sheets-Sheet 2
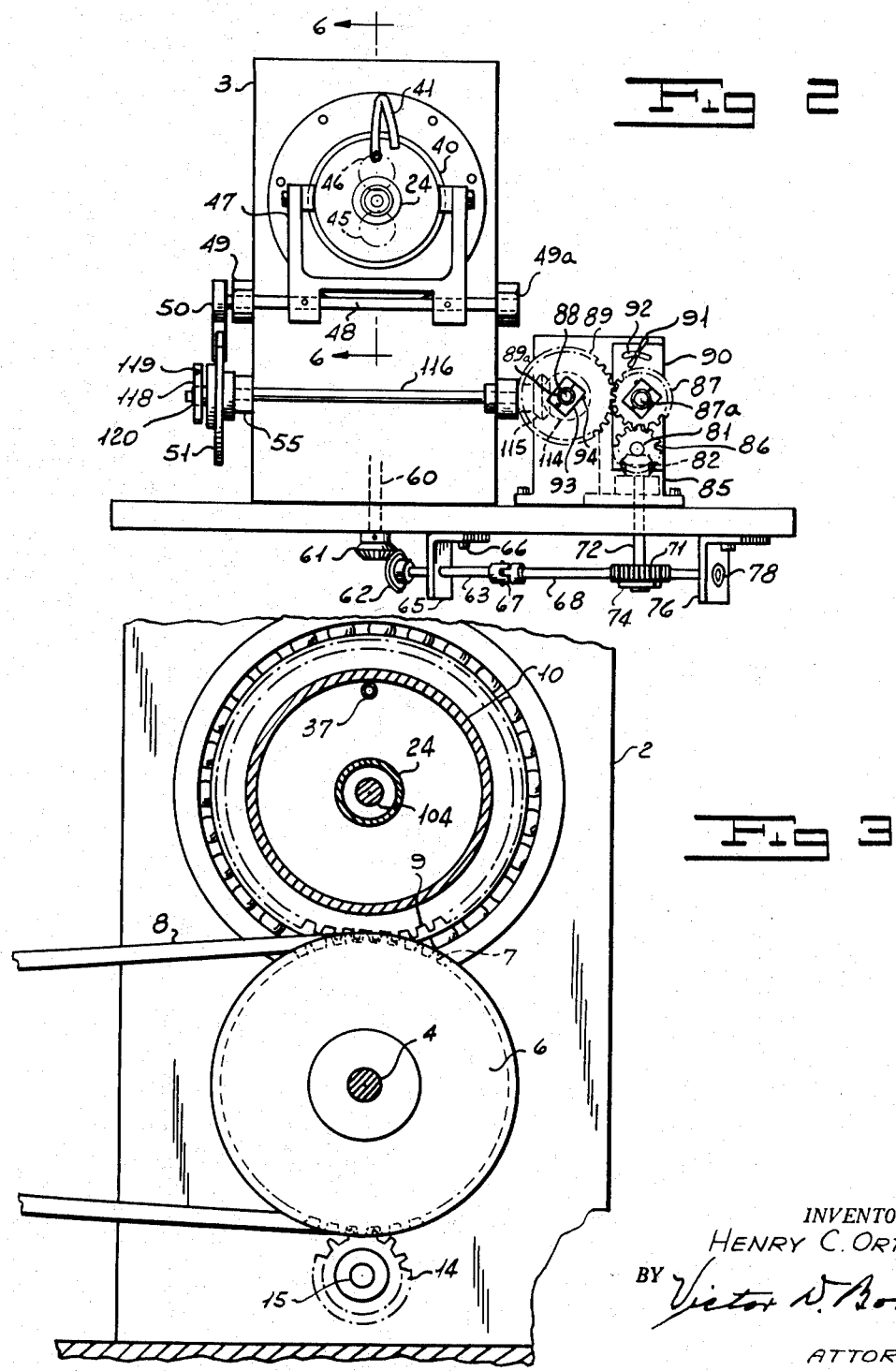
INVENTOR.
HENRY C. ORTH
BY Victor N. Boret
ATTORNEY

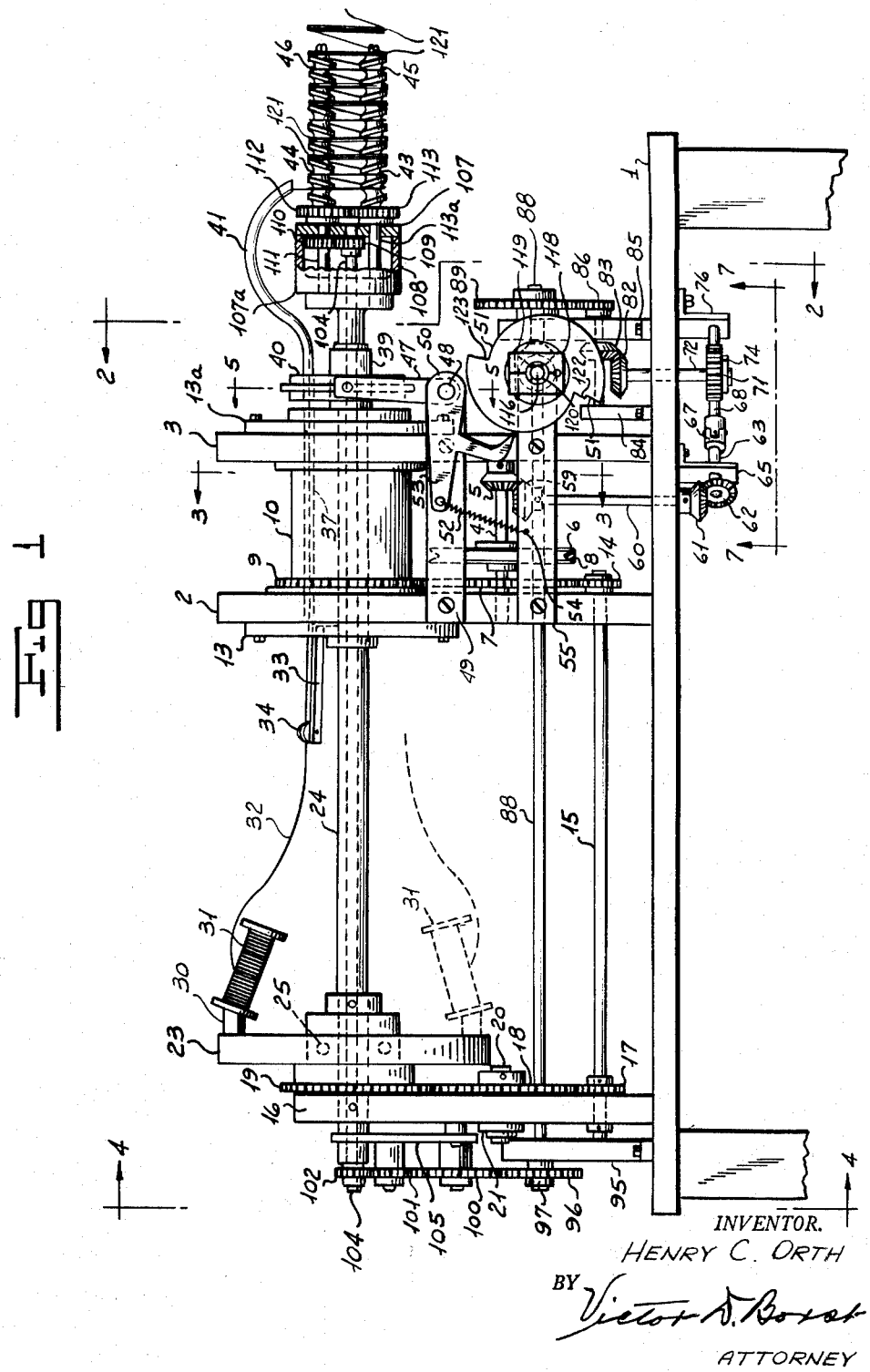

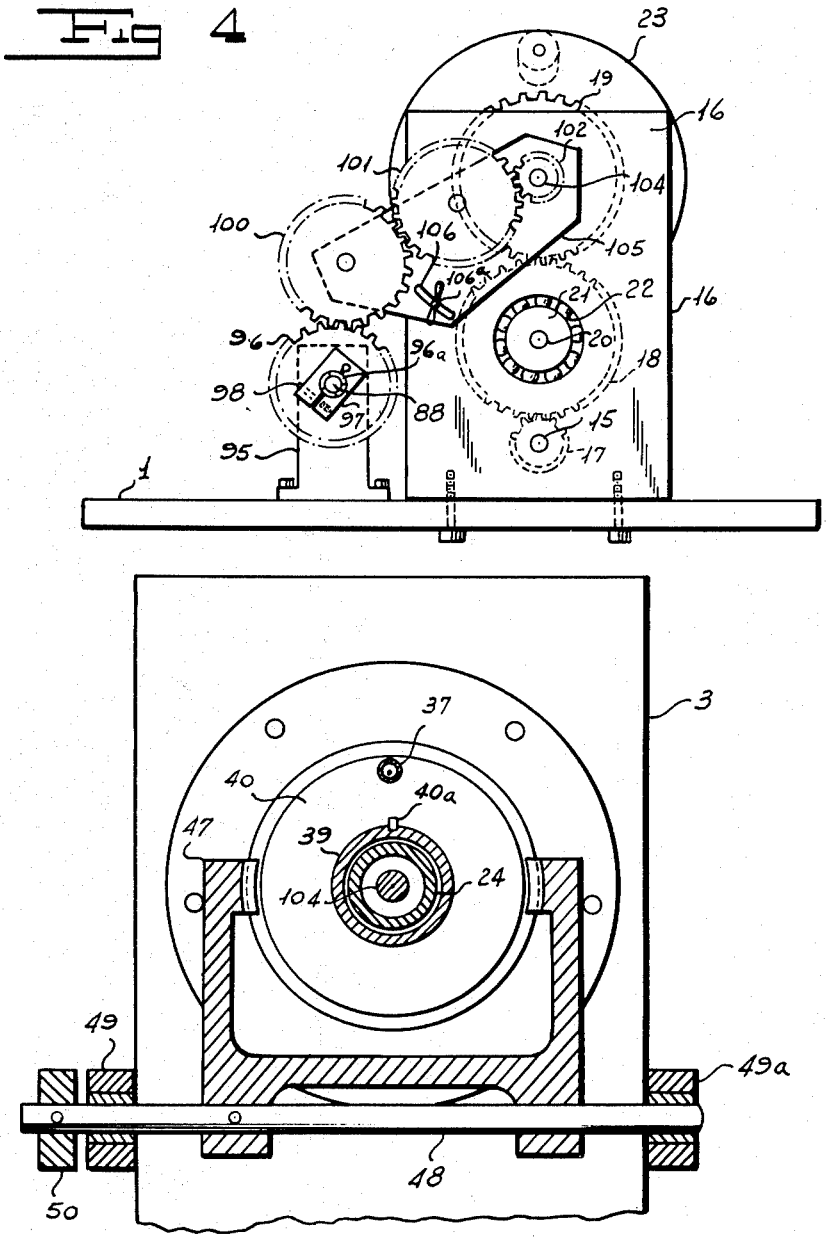

Nov. 22, 1955　　　　　H. C. ORTH　　　　　2,724,415
COIL WINDING MACHINE
Filed Oct. 25, 1951　　　　　　　　　　　　4 Sheets-Sheet 4
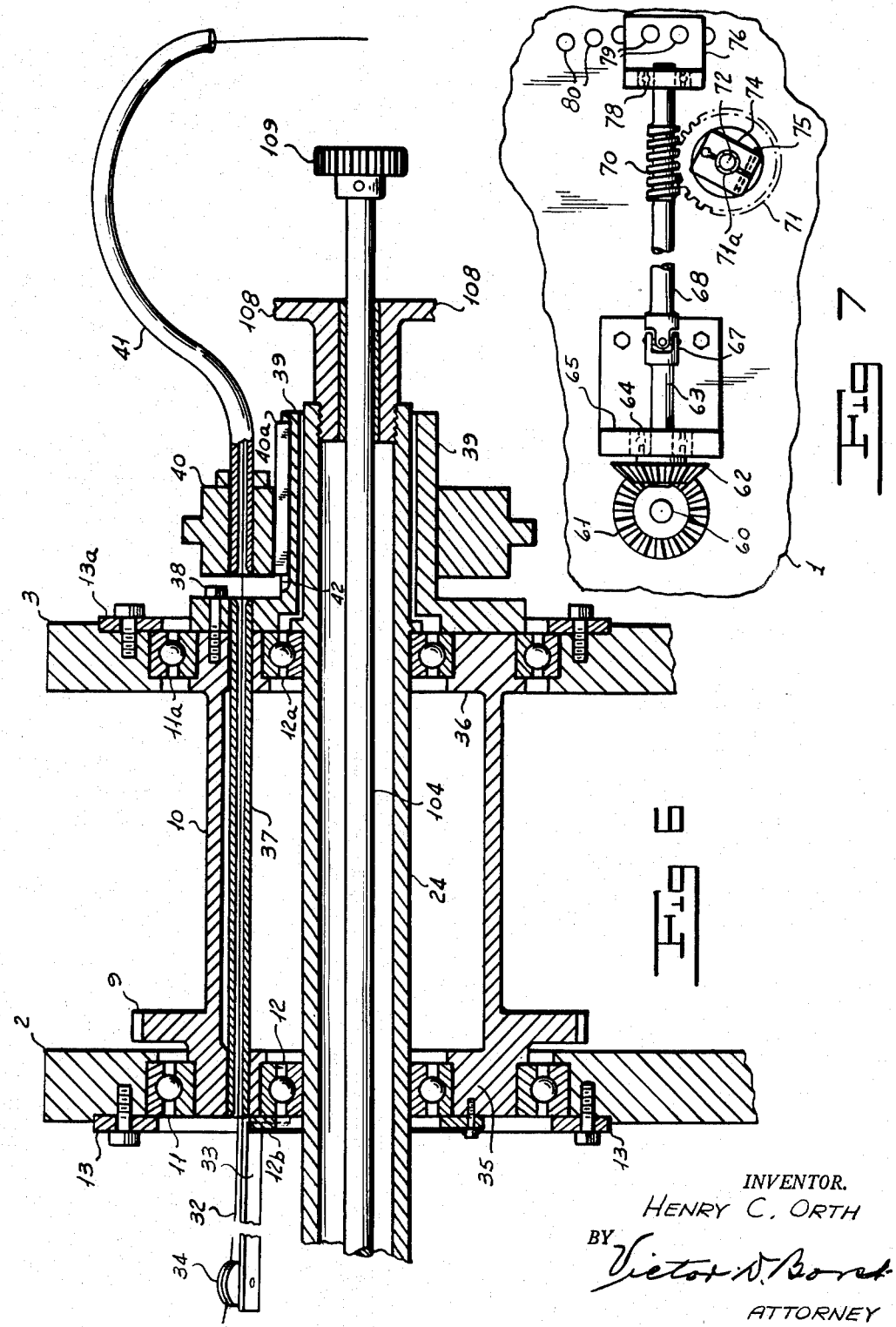
INVENTOR.
HENRY C. ORTH
BY
ATTORNEY

United States Patent Office 2,724,415
Patented Nov. 22, 1955

2,724,415

COIL WINDING MACHINE

Henry C. Orth, Bellerose, N. Y., assignor to Sperry Rand Corporation, a corporation of Delaware Application October 25, 1951, Serial No. 253,117

3 Claims. (Cl. 140—92.2)

This invention relates to a new and useful improvement in a machine for winding field or armature coils for electric motors and generators or the like.

An object of the present invention is to provide a machine of the general character shown and described in Patent No. 2,445,109 having means whereby coils may be successively wound in a plurality of connected sections, the number of sections in each group and the number of turns per section being controlled by a simple adjustment of the machine.

Another object of the invention is to provide a coil winding machine of simple design and construction for the above purpose and providing for a continuous flow and removal of completed coils without interruption to the winding of other coils.

Other objects and advantages will appear in the drawings and specification including the appended claims.

The accompanying drawings and detailed description below show that the coil sections are wound onto a pair of spirally grooved spindles by a wire guide as disclosed in the above mentioned patent. This feature of the coil winding machine forms no part of my invention. The novelty of the invention resides in the efficiency and simplicity with which the arrangement of those parts constituting the drive and operating means for the spindles, wire guide and feed means is affected. These advantages and improvements become apparent in the detailed description which follows but in general it may be said here that by driving one shaft not only is the requisite rotary movement thereby imparted through gear trains to the wire feed, wire cleaner and wire guide mechanisms, but also the required advance and retraction of the wire guide and operation of the spindles are accomplished through a train of gears which is also driven by this one motor driven shaft. There is accordingly achieved a compact, lightweight machine which comprises relatively few driving and driven parts and has improved efficiency in the distribution and character of its essential elements.

The objects and features of my invention will be apparent from the following description and accompanying drawings and the novel features are pointed out more particularly in the appended claims.

Fig. 1 is a side elevation of a coil winding machine;

Fig. 2 is a transverse vertical section taken along the line 2—2 of Fig. 1 showing the driving means for the wire guide in end elevation;

Fig. 3 is a vertical section taken along the line 3—3 of Fig. 1;

Fig. 4 is an end elevation as indicated by the line 4—4 of Fig. 1;

Fig. 5 is a vertical section taken along the line 5—5 of Fig. 1;

Fig. 6 is an enlarged fragmentary section on the line 6—6 of Fig. 2, showing details of the wire winding mechanism; and Fig. 7 is a bottom plan view as indicated by the line 7—7 of Fig. 1.

Referring to the drawings in detail the machine is disclosed as comprising a base plate 1 and pedestal brackets 2 and 3 extending therefrom. A drive shaft 4 extends between and rotatably bears in the pedestal brackets. Mounted on the drive shaft 4 is a bevel gear 5, a pulley 6 and gear 7. The pulley 6 drives the shaft 4 through a belt 8 which is driven by a motor (not shown). The gear 7 meshes with a ring gear 9 mounted on a hollow drum 10. The drum 10 is journalled in the pedestal brackets 2 and 3 (see Fig. 6) and is rotatably supported therein by outer bearings 11 and 11a and inner bearings 12 and 12a. These bearings are secured against longitudinal movement, as by ring plates 12b, 13 and 13a.

The gear 7 also meshes with a small gear 14 on shaft 15 the ends of which are rotatably supported in pedestal brackets 2 and 16. Closely adjacent to the inner wall of pedestal bracket 16 and mounted on shaft 15 is a small gear 17 which drives a gear train comprising idler gear 18 and gear 19. Idler gear 18 turns on axle 20 which is splined to hubs integrally and axially projecting from idler gear 18, the outer hub 21 being journalled to rotate in bearings 22 carried by pedestal bracket 16 (see Fig. 4). Gear 19 meshes with idler gear 18 and is mounted to rotate about a stationary sleeve 24 which extends through the three pedestal brackets 16, 2 and 3 and is fixed to bracket 16. Attached to gear 19 and driven in rotation about the sleeve 24 on bearings 25 is wire feed plate 23. Wire feed plate 23 carries on its inner surface an axial spool post 30, the outer portion of which serves as a spindle for the spool 31 and is inclined toward the axis of sleeve 24. This inclination facilitates unwinding of the wire 32 from the spool and the feeding of the wire toward the guide.

An arm 33 extends out from the end of the drum 10 and has on its outer end two cleaning pads 34, between which the wire 32 passes from the spool 31 and leads through a hole in the end of the drum into the guide 37 (see Fig. 6). The felt or other suitable material performs the function of wiping clean the wire before it is wound into coils. It is understood that the spool 31, arm 33 and drum 10 are always in the same position relative to one another as they are driven in rotation. This is due to the fact that the first train of gears mentioned 14, 7 and 9 are in identical gear ratios to the second gear train mentioned which comprises gears 17, 18 and 19.

Extending between and mounted in end walls 35 and 36 of the drum 10 is tubular guide 37. Mounted on the end wall 36 of drum 10 and attached thereto by bolts 38 is the flange of sleeve 39 which sleeve is thus mounted on drum 10 to rotate about the sleeve 24. A collar 40 rotates with the sleeve 39 but is relatively movable axially thereof, being keyed thereto by feather 40a in key-way 42. The collar 40 carries a hollow wire guide 41 through which the wire 32 is fed to grooves 43 and 44 of spindles 45 and 46, respectively. The mechanism for rotating the spindles on their axles and the consequent advance of the helical grooves will be explained below.

The collar 40 is actuated axially by a yoke 47 mounted on a shaft 48. Brackets 49 and 49a are mounted on the pedestal brackets 2 and 3 and support shaft 48. The shaft 48 carries a cam follower 50 which is adapted to engage the surface of a cam 51 and is held against the cam by a spring 52 extending between one arm 53 and pin 54 mounted on bracket 55.

The operation of the spindles 45 and 46 and the cam 51 is accomplished very simply and with a minimum of interconnecting elements. Bevel gear 5 on shaft 4 meshes with bevel gear 59 to drive vertical shaft 60 on the bottom end of which is mounted another bevel gear 61.

Bevel gear 61 meshes with bevel gear 62 to drive shaft 63 on which bevel gear 62 is mounted. The shaft 63 is journalled in bearing 64 carried in bracket 65 which is affixed to base plate 1 by bolts 66. Shaft 63 is connected by a universal coupling 67 to shaft 68 carrying near its end portion a worm 70 which engages worm wheel 71 mounted on stub shaft 72. As illustrated in Fig. 7 worm wheel 71 has a split hub 71a which is secured to the stub shaft 72 by clamp 74 and screw 75 or is released by the same means to allow adjustment of the worm wheel angularly or to allow replacement of the worm wheel with another of a different size in order to vary the speed of advance of the wire guide and the rotative speed of the spindles 45 and 46. In order to permit a change of gear ratios and still preserve the engagement of the worm and worm wheel, bracket 76 in which the end of shaft 68 is journalled in bearing 78 is adjustably mounted by means of cap screws 79 extending in threaded holes 80 arranged in an arc in base plate 1 and spaced to accommodate standard size worm wheels.

The stub shaft 72 serves to drive shaft 81 through bevel gears 82 and 83 mounted on stub shaft 72 and 81 respectively. Shaft 81 is journalled in brackets 84 and 85 which are secured to base plate 1 and on its outer end carries gear 86 which meshes with idler gear 87 to drive shaft 88 through gear 89 mounted thereon. Gear 87 rotates on a stub shaft 87a which is supported in bearings in a boss on plate 90. The plate 90 is adjustable, being mounted by means of wing nut 91 extending through an arcuate slot 92 to pivot in adjacence to bracket 85 about the shaft 81. Gear 89 has a split hub 89a and is therefore removable for the substitution of gears of different diameters. Clamp 93 and screw 94 are identical in construction and function to clamp 74 and screw 75. Shaft 88 extends substantially the entire length of the machine, being journalled in brackets 85 and 95 which are secured to base plate 1. Mounted on shaft 88 on the outer side of bracket 95 is gear 96 which also is removably secured to the shaft by means of clamp 97, screw 98 and split hub 96a. The gear 96 drives gears 100, 101 and 102 the latter being mounted on shaft 104 which rotates within sleeve 24. Gears 100 and 101 are mounted in bearings on plate 105 which pivots about the shaft 104, being positioned within the limits of arcuate slot 106 by wing nut 106a to enable the gear 100 to engage gear 96 of selected diameter.

Shaft 104 extends axially of sleeve 24 throughout its length and is supported in bearings of stationary housing 108 which is attached to the sleeve 24. Pinion 109 mounted on shaft 104 within the housing 108 meshes with pinion 110 to drive shaft 111 which is journalled in bearing plate 107 and rear wall 107a of the housing 108, extending through bearing plate 107 and carrying gear 112 and the spindle 46. Gear 112 engages gear 113 to drive shaft 113a which is supported in bearings in bearing plate 107 and rear wall 107a of the housing 108 and carries the spindle 45. This embodiment of the invention discloses the spindles 45 and 46 as being driven at the same speed but in opposite directions.

The means for causing the wire guide to advance and retract in accordance with the number of sections of coil and turns per section desired is similar to those disclosed in Patent No. 2,445,109. Near bracket 85 and mounted on shaft 88 is bevel gear 114 which engages bevel gear 115 to drive shaft 116 on which the cam 51 is adjustably mounted by means of clamp 118 and screw 119 on its split hub 120. Due to the combined action of cam 51, cam follower 50, shaft 48 and yoke 47, the collar 40 to which the wire guide 41 is attached is made to advance and retract axially while rotating with the sleeve 39 to wind coil sections 121.

The number of coil sections and the number of turns to be wound in each section may be regulated by selecting a cam 51 with the appropriate number and slope of cam lobes and by selecting the appropriate gear ratios. As illustrated in Fig. 1, the cam 51 has a stepped shoulder 122 terminating one lobe which has substantially twice the height of the shoulder 123 terminating the other lobe.

The operation is similar to that described in Patent No. 2,445,109, taking into account that herein there is shown a two lobe cam instead of the four lobe cam of the patent. Consequently the coils wound are in groups of two instead of four sections. The stepped shoulder 122 functions as does the sloped final shoulder of the cam of the patent to lay one or two turns of wire in the pair of grooves between the groups of coil sections, thereby providing the necessary lead-in wires for the coils.

As the coil sections 121 are fed from the free ends of the spindles 45 and 46, they may be manually or automatically clamped with clips so that they will be preserved in a condition for mounting in the field or armature slots of the electric motor or generator in the usual manner.

Although a specific embodiment of the invention has been shown for purposes of illustration, it is to be understood that various changes and modifications may be made therein by a person who is skilled in the art within the scope of the invention as defined in the appended claims. In practice it has been found feasible to operate duplicate coil winder machines from one power source. It is also considered that a coil winder machine having a plurality of spools and wire guides is entirely practicable and within the scope of the invention.

What is claimed is:

1. In a coil winding machine in which successive coils are wound in the helical grooves of rotating spindles a stationary sleeve, a spindle housing fixedly supported at one end of said stationary sleeve, pedestal brackets supporting the proximate intermediate portion of said stationary sleeve, a bracket fixedly supporting the other end of said stationary sleeve, a shaft rotatably supported within said stationary sleeve and extending into said housing, a pair of spindles the shafts of which are journalled in said housing, said spindles being thereby held against bodily revolution, meshing gears connected to said shaft and spindle shafts in said housing for driving the spindles in axial rotation, a drum journalled to rotate in said first mentioned pedestal brackets coaxially of said stationary sleeve, means for rotating said drum, a rotatable sleeve connected to said drum being driven thereby coaxially with said stationary sleeve, a wire guide supported in said drum in parallel with said stationary sleeve, a second wire guide aligned with the wire guide within the drum and mounted to rotate with said rotatable sleeve and revolve about said spindles to lay the turns of wire in the advancing grooves thereof, means for advancing said wire guide on said rotatably driven sleeve in synchronism with the advance of the spindle grooves and retracting said wire guide when a predetermined number of turns have been built up in said grooves and means for driving said shaft to axially rotate the spindles.

2. In a coil winding machine as claimed in claim 1 a wire feed plate rotatably supported on said stationary sleeve on the side of said drum opposite the axially rotated spindles, means for rotating said wire feed plate in unison with said drum and said second wire guide and a spool carried on the inner surface of said wire feed plate for supplying the wire for the coils and which is adapted to feed the wire toward the guides as the coils are built on the spindles.

3. In a coil winding machine as claimed in claim 1, a plate mounted to pivot on said shaft on the outer side of said last mentioned bracket, gears mounted on said plate for driving said shaft and means for driving said plate mounted gears including a removable gear of preselected diameter in driving connection with one of said plate mounted gears when the pivotal position of said plate is adjusted for meshing engagement of said preselected driving gear and one of plate mounted gears.

References Cited in the file of this patent

UNITED STATES PATENTS

| | | |
|---|---|---|
| 1,397,286 | Kershaw | Nov. 15, 1921 |
| 1,465,359 | Holt | Aug. 21, 1923 |
| 1,952,803 | Herbest Jr. | Mar. 27, 1934 |
| 2,114,287 | Cullin | Apr. 19, 1938 |
| 2,187,267 | Galligan | Jan. 16, 1940 |
| 2,233,982 | Kelley | Mar. 4, 1941 |
| 2,445,109 | Ferguson | July 13, 1948 |
| 2,533,506 | Richard | Dec. 12, 1950 |